United States Patent [19]

Goel et al.

[11] Patent Number: 4,726,868

[45] Date of Patent: Feb. 23, 1988

[54] POLYOL/POLYEPOXIDE/POLYURE-THANE ADHESIVE

[75] Inventors: Anil B. Goel, Worthington; Harvey J. Richards; Robert A. Grimm, both of Columbus, all of

[73] Assignee: Ashland Oil, Inc., Ashland, Ky.

[21] Appl. No.: 868,462

[22] Filed: May 30, 1986

Related U.S. Application Data

[62] Division of Ser. No. 702,706, Feb. 19, 1985, Pat. No. 4,613,660.

[51] Int. Cl.[4] .............................. C09J 3/14; C09J 3/16; C09J 5/02
[52] U.S. Cl. ................................ 156/307.3; 156/330; 156/331.4
[58] Field of Search ................... 156/330, 331.4, 307.3

[56] References Cited

U.S. PATENT DOCUMENTS

| | | | |
|---|---|---|---|
| 3,136,731 | 6/1964 | Piechota et al. | 528/53 |
| 3,242,108 | 3/1966 | McGary et al. | 528/73 |
| 3,510,439 | 5/1970 | Koltenbach et al. | 528/56 |
| 3,525,779 | 8/1970 | Hawkins | 525/528 |
| 3,565,972 | 2/1971 | Harris | 528/48 |
| 3,634,327 | 1/1972 | Hawkin | 528/49 |
| 3,636,133 | 1/1972 | Hawkins | 525/528 |
| 3,637,903 | 1/1972 | Brizgys | 528/52 |
| 3,676,407 | 7/1972 | Hsieh et al. | 156/331.7 |
| 4,080,401 | 3/1978 | Kassner | 525/438 |
| 4,386,191 | 5/1983 | Di Salvo et al. | 528/73 |
| 4,562,227 | 12/1985 | Rogler et al. | 528/73 |

*Primary Examiner*—John Kight
*Assistant Examiner*—Dennis R. Daley
*Attorney, Agent, or Firm*—John F. Jones

[57] ABSTRACT

Fast curing adhesives which are free of solvent and have high heat resistant bonding strength composed of mixtures of polyols, polyepoxides and polyisocyanates are described.

7 Claims, No Drawings

POLYOL/POLYEPOXIDE/POLYURETHANE ADHESIVE

This is a division of copending patent application Ser. No. 702,706, filed Feb. 19, 1985, now U.S. Pat. No. 4,613,660.

This invention relates to adhesives composed of polyols, polyepoxides and polyisocyanates and to a process for their manufacture and more particularly pertains to adhesives which give fast curing bonds of high adhesiveness and having high heat resistance said adhesives comprising mixtures of the essential components polyols, polyepoxides and polyisocyanates.

Adhesive formulations based on polyols and polyisocyanates are known. Although these adhesive formulations provide good adhesion properties toward metal and plastic surfaces, they usually decompose and lose adhesiveness when exposed for periods as short as 30 minutes to temperatures of 400° F. or higher.

Although prior art polyurethane adhesives, either single component or two-component, exhibit excellent adhesion properties, they are known to have poor performance when exposed to temperatures in the range of 400°–425° F. We have found that the inclusion of epoxides and their reaction either simultaneously or sequentially with isocyanate results in significant improvement of heat resistance of the adhesives in addition to the improvement in the adhesive bond strength.

The present invention relates to novel solvent free adhesive compositions which are curable under a wide variety of curing conditions (from room temperature or below to 250° C.) to form a strong adhesive bond to a wide variety of substrates and which retain exceptional bond shear strength even after 30 minutes exposure to temperatures of 400° F. or more. Furthermore, the adhesives of this invention which involve interpolymerization of polyols, polyepoxides and polyisocyanates provide excellent adhesion to a variety of cured sheet molding compound (SMC) surfaces without the extensive surface preparation such as cleaning, degreasing, roughing and primary operations; and because these adhesives do not involve the use of a solvent, the usual concern for flammability, toxicity, time for evaporation, etc., often associated with solvent systems is obviated. Thus, we have found that the adhesives obtained from the interpolymerization of polyols, polyepoxides and polyisocyanates, preferably in the presence of a suitable polyurethane catalyst such as an organo tin (II) compound or a mixture of organo tin and organo iron compounds such as tin(II) octoate and iron (III) acetylacetonate, demonstrate excellent adhesion properties with high shear strength even after being exposed to temperatures up to about 425° C.

One convenient way to practice this invention is by the use of a two-component adhesive system. One component is composed of a mixture of a polyol and a polyepoxide. The equivalent functionality ratio (hydroxyl versus epoxy group) may vary in the range of 98/2 to 50/50. Usually the urethane catalyst, if one is used, is included in this component. Catalyst amount can vary from about 0.001 to 5% by weight based on the weight of combined polyol/polyepoxide in the first component. Aromatic amines, particularly those with sterically bulky groups such as diethyl toluene diamine and other primary and secondary amines which are known to react slowly with epoxides can be included in the first component in amounts ranging from 0.5 to 10% by weight based on the total weight of the first component. The second component is a polyisocyanate and preferably an isocyanate prepolymer obtained from the reaction of a polyisocyanate (in excess) with a polyol. The ratio of the isocyanate equivalent in the second component to the combined hydroxyl-epoxy equivalent in the first component should be in the range of from about 0.8 to 2.0.

Polyols useful in this invention include those compounds having at least two hydroxyl groups per molecule and having equivalent weights falling in the range of from 20 to 5000. Specific polyols include butane diol, cyclohexane dimethanol, tripropylene glycol, amide diols

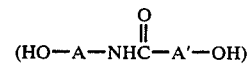

wherein A and A' are independently alkyl or aryl groups with 2 to 20 carbon atoms, urethane diols

wherein A and A' have the foregoing designation, polyether polyols, such as poly(tetra-methylene ether) diols, poly(propylene ether) polyols, polyester polyols, and the like.

Polyhydroxy polyethers are suitable polyols and preferably those having at least 2 hydroxyl groups per molecule. Polyhydroxy polyethers can be prepared by polymerization of epoxides such as ethylene oxide, propylene oxide, butylene oxide, tetrahydrofuran, styrene oxide, or epichlorohydrin either alone or by chemical addition to other materials. Suitable other materials include ethylene glycol, propylene glycol, trimethylol propane, 4,4'-dihydroxy diphenyl propane and the like. Sucrose polyethers also may be used. Polybutadienes having hydroxyl groups as well as other known hydroxyl containing vinyl addition type polymers can be used as polyols in this invention.

According to this invention, hydroxyl containing polyesters, polythioethers, polyacetals, polycarbonates or polyesteramides of the types known for the formation of polyurethanes can also be used.

The polyepoxides useful in the present invention can be monomeric or polymeric, saturated or unsaturated, aliphatic, cycloaliphatic, aromatic or heterocyclic, and they can be substituted if desired with other substituents besides the epoxy groups, e.g., hydroxyl groups, ether radicals, halogen atoms, and the like. Typical epoxy components suitable in the practice of this invention include those disclosed in U.S. Pat. Nos. 2,500,600 and 2,324,483 which are incorporated here by reference. Preferred in this invention are 1,2-epoxy compounds having an epoxide equivalence greater than 1, that is to say, compounds containing more than one group of the formula

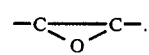

The 1,2-epoxide groups may be either terminal or inner ones. Particularly suitable terminal 1,2-epoxide groups are 1,2-epoxy ethyl or 1,2-epoxy propyl groups. The latter may be linked to an oxygen atom, that is to say, they are glycidyl ether or glycidyl ester groups. Compounds with inner epoxide groups usually contain the 1,2-epoxide group in an aliphatic chain or in a cycloaliphatic ring.

As epoxy compounds containing an inner 1,2-epoxy group there are suitable epoxidized diolefins, dienes, or cyclic dienes, such as 1,2,5,6-diepoxy hexane, 1,2,4,5-diepoxy cyclohexane, dicyclopentadiene diepoxide, dipentene diepoxide, and vinyl cyclohexene diepoxide; epoxidized diolefinically unsaturated carboxylic acid esters, such as methyl-9,10,12,13-diepoxy stearate, or the dimethyl ester of 6,7,10,11-diepoxyhexadecane-1,16-dicarboxylic acid. Furthermore, there may be mentioned epoxidized mono-,di- or poly-acetals containing at least one cyclo-aliphatic 5-membered or 6-membered ring, to which at least two 1,2-epoxide groups are linked.

A widely used class of polyepoxides which can be used in the present invention are the epoxy polyethers obtained by reacting a halgen containing epoxide or dihalohydrin, such as epichlorohydrin, epibromohydrin, 3-chloro-1,2-epoxyoctane; and the like with either a polyhydric phenol or a polyhydric alcohol.

Although the preferred polyepoxides are those containing at least two epoxy groups per molecule and also include one or more hydroxyl group per molecule, epoxides containing no hydroxyl groups are also useful.

The polyisocyanates useful in this invention include organic isocyanates having at least two isocyanate groups per molecule. The polyisocyanates can be of low, high or intermediate molecular weight and can be any of a wide variety of organic polyisocyanates including ethylene diisocyanate, trimethylene diisocyanate, dodecamethylene diisocyanate, hexamethylene diisocyanate, hexamethylene diisocyanate trimer, tetraethylene diisocyanate, pentamethylene diisocyanate, propylene-1,2-diisocyanate, 2,3-dimethyl tetramethylene diisocyanate, butylene-1,2-diisocyanate, butylene-1,3-diisocyanate,-1,4-diisocyanato cyclohexane, cyclopentene-1,3-diisocyanate, p-phenylene diisocyanate, 1-methyl phenylene-2,4-diisocyanate, naphthalene-1,4-diisocyanate, toluene diisocyanate, diphenyl-4,4'-diisocyanate, benzene-1,2,4-triisocyanate, xylene-1,4-diisocyanate, xylylene-1,3-diisocyanate, 4,4'-diphenylene methane diisocyanate, 4,4'-diphenylene propane diisocyanate, 1,2,3,4-tetraisocyanato butane, butane-1,2,3-triisocyanate, polymethylene polyphenyl isocyanate, and other polyisocyanates having an isocyanate functionality of at least two which are more fully disclosed in U.S. Pat. Nos. 3,350,362 and 3,382,215. Polyisocyanates which are polymeric in nature including isocyanate prepolymers of all types are particularly useful in this invention.

The adhesives of this invention may contain fillers, colorants, dyes, etc. Common fillers for instance, such as talc, Kaophile (an alumina), metal powders and the like can be present in amounts varying up to about 40% by weight of the total adhesive components.

In a typical adhesive formulation according to this invention an alkylene polyol having an hydroxyl equivalent weight of 371 was obtained by reaction of poly(-propylene ether) triol (eq. weight of 1167) and poly-(alkylene ether) tetraol (equivalent weight about 117) with toluene diisocyanate. This polyol was blended with liquid diglycidyl ether of bisphenol-A(10% by weight). Tin(II) octoate (0.04%) and iron (III) acetoacetate (0.08%) were dissolved in this solution. To this solution was added 23% by weight of Kaophile 2 filler. The resulting first component was then mixed with an appropriate amount of the second component which was an isocyanate prepolymer (NCO equivalent weight of 275) which contained 24% by weight of the filler. The resulting mixture was then used as an adhesive which was observed to have the following features:

a. Open time (working time prior to gelation) about 15 minutes.
b. 95° C. cure time—two to three minutes.
c. 100% solids.
d. Bonds to a wide variety of substrates.
e. Excellent wetting of substrate surface without a primer.
f. Excellent cohesive strength in the cured bond
g. Flexible bond.

The composition described just above when tested as an adhesive for panels molded from sheet molding compound (SMC) showed excellent shear strength after curing at 250° F. for 30 minutes. Similar bond strength was observed when the system was baked at 425° F. for 30 minutes and tested at room temperature. This is contrary to the results obtained using a polyurethane adhesive not having epoxy resin in it which failed in adhesive properties when baked at 425° F. for 30 minutes.

In the following examples which will further illustrate this invention, the following general procedures were used for preparing, using and testing the adhesives and adhesive bonds formed.

Procedure for Preparing Adhesive Bonds

The two components of the adhesive were mixed in appropriate weight amounts under an inert atmosphere such as nitrogen at room temperature. The resulting adhesive mixture was then applied in the form of a ⅛" bead across the first substrate test sheet which measured 12"×4"×100 mils which was first wiped clean with acetone after sprinkling the surface of the test sheet with a few 30 mils diameter glass beads on top of the adhesive to get a final adhesive lap of 30 mils, a second test sheet was placed on top of the first test sheet in contact with the adhesive and in such a manner as to create a one-inch overlap of the sheets at the bond site. The sandwich test sample at this stage was held at room temperature until the adhesive gelled and was then placed in an oven at 250° F. for post curing for 30 minutes. Test samples were cut as one-inch strips from the cured specimens for testing.

Bond Test Procedure

The following tests were carried out using three samples for each test.

(A) Shear strength test at room temperature after samples had been post cured at 250° F. for 30 minutes.
(B) Post baking at 425° F. for an additional 30 minutes and shear testing at room temperature.
(C) Shear strength test at 180° F. after 30 minutes of baking at 425° F.
(D) Shear strength test at room temperature on 250° F. post-cure samples after immersion in water at 203° F. for 24 hours.
(E) Shear strength test on post-baked samples at 425° F. for 30 minutes after immersion for 24 hours in water at 203° F.

EXAMPLE 1

This Example is for comparison purposes and is outside the scope of the present invention. The first component was a poly(propylene ether) triol and tetraol having an hydroxyl equivalent of 382 which also contained 0.08% by weight of iron(III) acetonyl acetate and 0.04% by weight of tin(II) octoate. Kaophile 2 was also present in 25% by weight. The second component as a polyisocyanate prepolymer obtained by reaction of an excess of oligomerized liquid 4,4'-methylene bis(phenyl isocyanate) with poly(propylene ether) diol (equivalent weight of about 500) having an isocyanate equivalent weight of 275 and was filled with 25% by weight of Kaophile 2. Fifteen grams of each of the components were mixed and used as adhesives following the above-described procedure using as substrate panels a cured fiberglass reinforced polyester sheet molding compound. Although substrate failure was observed during shear strength testing with the samples following test procedure (A) at 500 psi, cohesive/adhesive failure occurred upon testing following procedure (B) at about 50 psi. In test (B) an excessive bubbling in the glue line was observed.

EXAMPLE 2

The procedure of Example 1 was followed except that the first component was made up of 66.5% by weight of the polyether polyol (eq. wt. 371), 7.4% by weight of diglycidyl ether of bisphenol-A, 0.08% of iron(III) acetyl acetonate, 0.04% by weight of tin(II) octoate and 26% by weight of Kaophile-2 filler. To 30 g. of the first component was mixed with 24.8 g of an isocyanate prepolymer (NCO eq. weight 389) containing 26% by weight of Kaophile 2 and the resulting adhesive was tested on SMC samples as in Example 1. The test results are shown in Table 1.

TABLE I

| Sample No. | Test Procedure | Lap Shear Strength (psi) | Failure Mode |
|---|---|---|---|
| 1 | A | 770 | DL |
| 2 | A | 775 | SB |
| 3 | A | 835 | SB |
| 4 | B | 575 | DL |
| 5 | B | 785 | SB |
| 6 | B | 670 | SB |
| 7 | C | 360 | DL |
| 8 | C | 370 | DL |
| 9 | C | 385 | DL |
| 10 | D | 585 | DL |
| 11 | D | 675 | DL |
| 12 | D | 680 | DL |
| 13 | E | 520 | SB |
| 14 | E | 505 | DL |
| 15 | E | 590 | SB/DL |
| 16 | F | 245 | CF |

DL = SMC Delamination at the Joint
SB = Substrate Broke;
CF = Cohesive Failure

This demonstrates that the adhesive performs well even after exposure to high temperatures (425° F.) for as long as 30 minutes.

EXAMPLE 3

The procedure of Example 1 was followed except that the first component was a mixture of 37 g of epoxy resin, 333 g of the polyol described in Example 1, 0.4 g of iron (III) acetyl acetonate, 0.2 g of tin (II) octoate containing 26% by weight of Kaophile 2 filler. The epoxy resin was prepared by reacting 99.56 g of a diglycidyl ether of bisphenol-A with 15.22 g of 1:2 molar butane diol/maleic anhydride reaction product in the presence of 0.34 g of Ph$_3$P catalyst at 120° C. for about 2 hours. This material had an hydroxyl equivalent weight of 1066 and an epoxy equivalent weight of 267.7. To 30.1 g of the first component was added with mixing 25.7 g of the isocyanate prepolymer of Example 1. The resulting product was applied as an adhesive to SMC samples and tested as described above. The test results are shown in Table 2.

TABLE 2

| Sample No. | Test Procedure | Lap Shear Strength (psi) | Failure Mode |
|---|---|---|---|
| 1 | A | 400 | SB |
| 2 | A | 690 | SB |
| 3 | A | 570 | DL |
| 4 | B | 750 | SB/DL |
| 5 | B | 595 | DL |
| 6 | B | 425 | SB |
| 7 | C | 345 | SB |
| 8 | C | 300 | SB |
| 9 | C | 315 | SB |
| 10 | D | 410 | SB |
| 11 | D | 635 | DL |
| 12 | D | 300 | SB |
| 13 | E | 295 | SB |
| 14 | E | 505 | SB |
| 15 | E | 575 | SB/DL |
| 16 | F | 220 | CF |

EXAMPLE 4

The procedure of Example 1 was followed using in the first component 199.5 g of the polyol described in Example 1, 22.16 g of a modified epoxy resin, 0.24 g of iron (III) acetyl acetonate, 0.12 g. of tin(II) octoate and 78 g of Kaophile 2 filler. The modified epoxy resin was prepared by reacting 388.7 g of poly(alkylene ether) diepoxide with 100 g of 1:2 molar butane diol/maleic anhydride reaction product in the presence of 0.9 g of Ph$_3$P at 120° C. for two hours. This first component (30.1 g) was mixed with 26.1 g of polyisocyanate prepolymer to form the adhesive and was tested as in Example 1 on SMC test panels. The results are given in Table 3.

TABLE 3

| Sample No. | Test Procedure | Lap Shear Strength (Psi) | Failure Mode |
|---|---|---|---|
| 1 | A | 520 | DL |
| 2 | A | 630 | SB |
| 3 | A | 665 | DL |
| 4 | B | 470 | SB |
| 5 | B | 365 | SB |
| 6 | B | 490 | SB/DL |
| 7 | C | 360 | DL |
| 8 | C | 185 | SB |
| 9 | C | 320 | DL |
| 10 | D | 370 | SB |
| 11 | D | 505 | DL |
| 12 | D | 510 | DL |
| 13 | E | 485 | SB |
| 14 | E | 355 | SB |
| 15 | E | 370 | SB |
| 16 | F | 205 | CF |

EXAMPLE 5

The procedure of Example 2 was followed using in the first component as polyol 66.4% by weight of bis-hydroxyethyl dimerate (dimerized linoleic acid capped with ethylene oxide), 8.3% by weight of the diglycidyl ether of bisphenol-A, 0.07% by weight of the iron (III) acetyl acetonate, 0.04% by weight of tin (II) octoate and 28.3% by weight of Kaophile 2. The two components were mixed as in Example 2 to give an adhesive which was tested on SMC samples. Test A gave a lap shear of 410 and a failure mode of SB, Test B gave a lap shear of 430 and a failure mode of SB, and test procedure D gave a lap shear of 420 and a failure mode of SB.

We claim:

1. The process for creating a strong, temperature resistant bond between the surface of two substrate materials comprising applying between said surfaces a mixture of two components the first of said components comprising a mixture of a polyol and a polyepoxide wherein the equivalent functionality ratio of hydroxyl to epoxy groups is within the range of from 98/2 to 50/50, and the second component comprising a polyisocyanate, wherein the ratio of isocyanate in the second component to combined hydroxyl/epoxy in the first component is in the range of from about 0.8 to 2.0, and curing said bond at a temperature in the range of from about room temperature up to about 250° C.

2. The process of claim 1 wherein there is also included in the first component from about 0.001 to 5% by weight of a polyurethane catalyst based on the weight of the first component.

3. The process of claim 2 wherein the polyisocyanate is isocyanate prepolymer.

4. The process of claim 3 wherein the polyol is a polyether polyol.

5. The process of claim 4 wherein the polyepoxide is a diglycidyl ether of bisphenol-A.

6. The process of claim 4 wherein the polyepoxide is one resulting from reaction of the diglycidyl ether of bisphenol-A and a 1:2 molar reaction product of butane diol and maleic anhydride.

7. The process of claim 3 wherein the polyol is dimerized linoleic acid capped with ethylene oxide.

* * * * *